(12) United States Patent
Gelman et al.

(10) Patent No.: US 6,647,375 B1
(45) Date of Patent: Nov. 11, 2003

(54) RISK REDUCTION SYSTEM

(75) Inventors: Bernard Gelman, Philadelphia, PA (US); James Joseph Broussard, Drexel Hill, PA (US)

(73) Assignee: Dynamic Risk Assumption, Inc., Philadelphia, PA (US)

( * ) Notice: Subject to any disclaimer, the term of this patent is extended or adjusted under 35 U.S.C. 154(b) by 0 days.

(21) Appl. No.: 09/460,601

(22) Filed: Dec. 14, 1999

(51) Int. Cl.$^7$ .................................................. G06F 17/60
(52) U.S. Cl. ............................................ 705/38; 705/37
(58) Field of Search ................................................ 705/37

(56) References Cited

U.S. PATENT DOCUMENTS

| | | |
|---|---|---|
| 4,642,768 A | 2/1987 | Roberts |
| 4,648,038 A | 3/1987 | Roberts et al. |
| 4,752,877 A | 6/1988 | Roberts et al. |
| 4,851,999 A | 7/1989 | Moriyama |
| 5,291,398 A | 3/1994 | Hagan |
| 5,390,113 A | 2/1995 | Sampson |
| 5,479,344 A | 12/1995 | Keziah, Jr. |
| 5,727,161 A | 3/1998 | Purcell, Jr. |
| 5,819,230 A | 10/1998 | Christie et al. |
| 5,911,136 A | 6/1999 | Atkins |
| 5,946,667 A | 8/1999 | Tull, Jr. et al. |
| 6,304,858 B1 * | 10/2001 | Mosler |

FOREIGN PATENT DOCUMENTS

JP   2002 3666-32   * 12/2002   ............ G06F/17/60

OTHER PUBLICATIONS

"Futures, Options&Swaps" Kolb R, 1999.*

* cited by examiner

*Primary Examiner*—Geoffrey R. Akers
(74) *Attorney, Agent, or Firm*—Caesar, Rivise, Bernstein, Cohen & Pokotilo, Ltd.

(57) ABSTRACT

A method for reducing risk including the steps of holding by a seller a liability having a future value $S_1$ and determining the present value $P_1$ of the liability in accordance with the future value $S_1$. The method also calls for buying the liability by a buyer entity for a value $P_2$ greater than the present value $P_1$, thereby providing a first net gain holding the liability by the buyer entity for a period of time and discharging the liability at the end of the period of time for a value $S_1$ that is less than the future value $S_2$ thereby providing a second net gain. The present value $P_2$ is determined according to the present value $P_1$ and according to a time t years prior to the time at which the value of the liability reaches $S_1$. The present value $P_2$ is determined according to the value $S_2$ and the future value $S_1$ is known at the time of the determining of the present value $P_1$. The first net gain is a net gain for the seller and the second net gain is a net gain for the buyer entity. The liability is recorded as a long term debt by the seller and may be at present value by the buyer entity. The buyer entity can be an insurance company.

14 Claims, 1 Drawing Sheet

RISK REDUCTION SYSTEM

FIELD OF THE INVENTION

This invention relates to the field of risk analysis and, in particular, to derecognition of debt.

BACKGROUND OF THE INVENTION

In order to establish uniformity in financial statement presentation the American Institute of Certified Public Accountants (AICPA) has published many writings. These writings are collectively referred to as Generally Accepted Accounting Principals (GAAP). GAAP establishes how, where, when and how much is reported on a financial statement. GAAP is required to be used by most businesses but not all. There are some exceptions.

According to GAAP, liabilities must be recorded at their face value. Current liabilities are defined as those that should be paid in one year's time or less from the Balance Sheet date. Long-term obligations are defined as those that are due to be paid after one year from the balance sheet date. For example, an account payable due in thirty (30) days for $100 would be recorded as a current liability of $100. In the case of a note payable due in ten (10) years the debt would be recorded as a long-term debt.

Whether a debt is an account payable or a note, it is thus recorded at its face value. No consideration is made of the present value of a future obligation when recording the debt. In fact GAAP forbids the recordation of a liability for any amount other than its face amount. However it is well known that long-term liabilities have a present value less than the face value at which they are recorded. Thus, the recorded value is greater than the actual present value but most companies must carry the greater value on their books in order to comply with GAAP.

Therefore, in order to avoid this inequity in GAAP some companies might find it desirable to sell one or more of its long-term obligations for a sum that approximates the present value of this debt. In order to accomplish this objective the debtor must derecognize this liability. According to GAAP in order for a liability to be extinguished one of the following conditions must be met:

The debtor pays the creditor and is relieved of its obligation for the liability. Or, the debtor is legally released from being the primary obliger under the liability, either judicially or by the creditor.

Liabilities are defined by GAAP as "probable future sacrifices of economic benefits arising from present obligations of a particular entity to transfer assets or provide services to other entities in the future as a result of past transactions or events." Items that would otherwise be classified as a liability would not be recognized as a liability if insured under a contract of insurance with a recognized insurance carrier. An example would be a company that is self insured for worker's compensation. The company's future loss obligations would be reflected as a liability on its financial statement according to GAAP. If the company were to then purchase a workers' compensation insurance contract, the liability would be derecognized in exchange for the premium paid to the insurance carrier.

The purchaser of the debt would therefore have to be an insurance carrier. The purchaser of the debt must be able to make a profit otherwise there is no business purpose for them to enter into the transaction. The insurance company would therefore charge a premium in excess of the present value of the obligation. The total sum paid by the seller would still be less than the face amount. Both buyer and seller profit.

SUMMARY OF THE INVENTION

A method for reducing risk including the steps of holding by a seller a liability having a future value $S_1$ and determining the present value $P_1$ of the liability in accordance with the future value $S_1$. The method also calls for buying the liability by a buyer entity for a value $P_2$ greater than the present value $P_1$, thereby providing a first net gain holding the liability by the buyer entity for a period of time and discharging the liability at the end of the period of time for a value $S_1$ that is less than the value $S_2$ thereby providing a second net gain. The present value $P_2$ is determined according to the present value $P_1$ and according to a time t years prior to the time at which the value of the liability reaches $S_1$. The present value $P_2$ is determined according to the value $S_2$ and the future value $S_1$ is known at the time of the determining of the present value $P_1$. The first net gain is a net gain for the seller and the second net gain is a net gain for the buyer entity. The buyer entity can be an insurance company.

DESCRIPTION OF THE DRAWING

The drawing shows the risk reduction method of the present invention.

DESCRIPTION OF THE PREFERRED EMBODIMENT OF THE INVENTION

Figure 1:
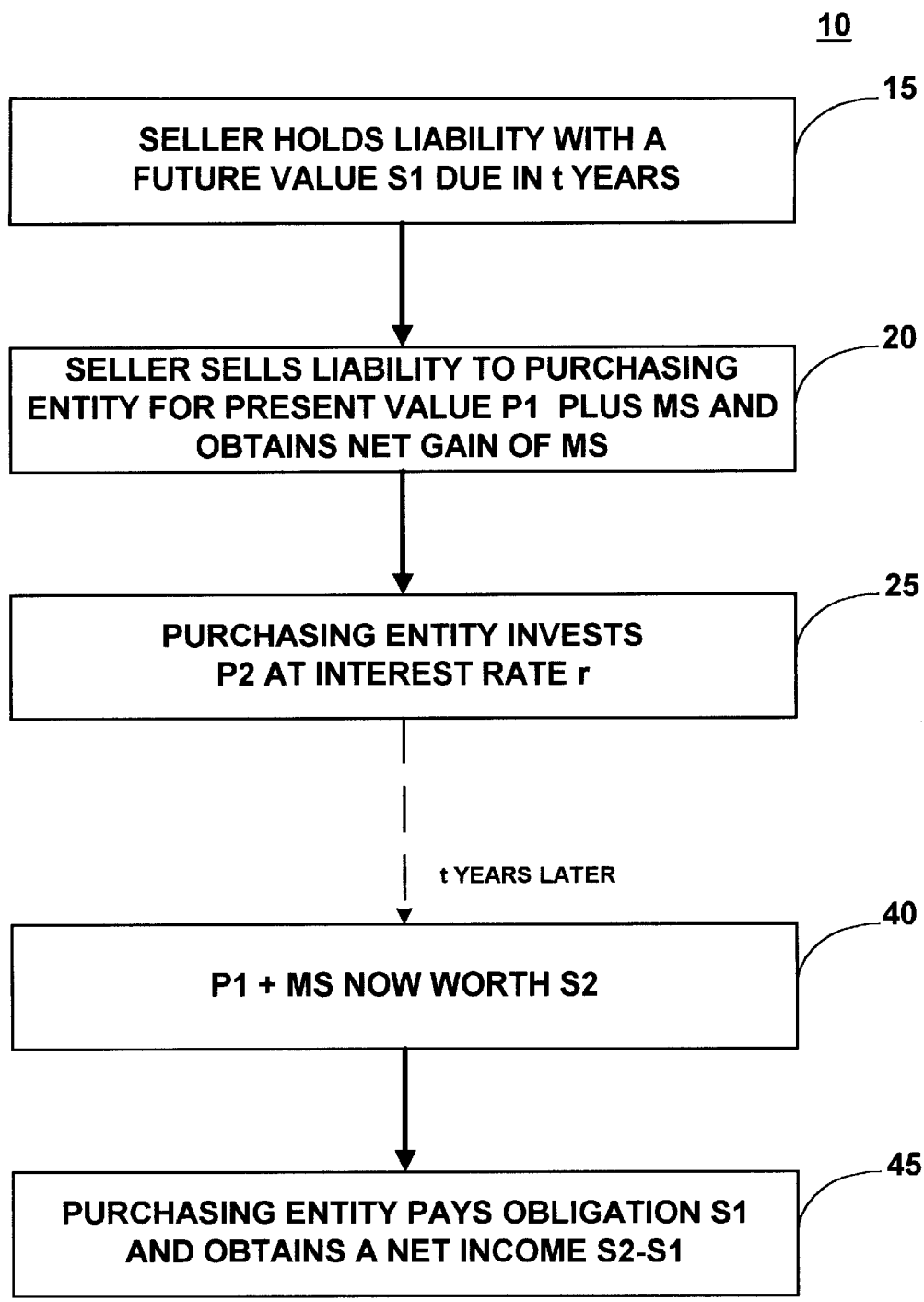

It is well known that GAAP does not permit most business entities to take into consideration the present value of a future obligation when recording their long term debts on their balance sheets. However, in accordance with the present invention, liabilities can be derecognized by purchasing an insurance contract from a recognized insurance carrier.

Referring now to FIG. 1, there is shown risk reduction method 10 of the present invention. In risk reduction method 10 a business entity holds a liability having a present value $P_1$ and a future value $S_1$ as shown in block 15. The liability is due in t years. The value $P_1$, the present value of the future value of $S_1$ as set forth in block 15, is the well known present value P which is calculated from a known future value S in the manner set forth below, which is well understood by those skilled in the art. The equation for performing the calculation of the present value P includes the rate of interest r and the amount of time the money is invested t.

In general, the present value P of a future obligation can be calculated from the well known equation for determining a future value S when a present value P is known:

$$S=P(1+r).$$

Performing a well known algebraic reduction yields:

$$S/(1+r)=P(1+r)/(1+r).$$

$$S/(1+r)=P.$$

Transposing the result of the algebraic reduction yields the equation for the present value P:

$$P=S/(1+rt),$$

where P is thus the amount of money that must be invested at the present time in order to produce the known future value S after t years at a rate of interest r where r can be zero or any value greater than zero.

In accordance with the method of the present invention the holder of the liability sells the liability to a purchaser company that can eliminate liabilities as defined by GAAP, wherein liability is understood to mean probable future sacrifices of economic benefits arising from present obligations of a particular entity to transfer assets or provide services to other entities in the future as a result of past transactions or events. Since the seller of the liability no longer faces a future sacrifice of economic benefits due to the liability, the liability is derecognized for the seller.

The purchaser can, for example, be an insurance company or a consortium including an insurance company. Such an entity can be defined as the purchaser herein. The sale is performed for a value $P_2$ equal to the present value $P_1$ plus a profit margin $M_s$ for the seller as shown in block 20 of risk reduction method 10. As shown in block 25, the purchaser invests the received value $P_2$ for a period of t years at a rate of interest r. After t years of investment in this manner, the value $P_2 = P1 + M_s$ has grown to $S_2$ as shown in block 40. However, the purchaser only owes the face value $S_1$ at that time, where $S_1$ is less than $S_2$. Therefore, when the purchaser pays the obligation $S_1$ it receives a net income of $S_2-S_1$ as shown in block 45.

As an example, consider the following. Assume the net present value of $100 due in ten (10) years is $30 in present dollars. Further assume that an insurance company purchases this debt in exchange for a payment from the seller of $45 in cash today. The liabilities of the seller are reduced by $100, cash is reduced by $45, and the seller recognizes the difference of $55 as income.

The buyer in this example receives $45 in the present. According to the assumption used above, $30 today is worth $100 in ten (10) years, $45 today is worth $150 in ten (10) years. Thus, in this example, the purchaser will discharge the note at its face value of $100 in then (10) years and earn a profit of $50, the difference between $150 and $100. As this example shows both the buyer and seller can make a profit on the transaction. As a further consequence of the present invention profits are realized that otherwise would not and the U.S. Treasury also benefits by collecting additional taxes since each transaction is taxable.

It will be understood that the values of $P_1$, $P_2$ and $S_2$ depend on the interest rate r, which is unknown at the time of the sale set forth in block 20. Thus, the buyer incurs a risk in this method. However, the obligation is a known value $S_1$. This eliminates some of the underwriting risk.

An insurance company normally assumes two risks. One of the risks is a casualty risk similar to the risk involved in, for example, life or health insurance. This risk is eliminated in risk reduction method 10 because the amount of the liability and the date it comes due are both known. The other risk is the rate of return r. This risk continues to be borne by the insurance company.

Thus in risk reduction method 10, the insurance company performs its essential service, it underwrites a risk. At the same time the insurance company provides the insured with an opportunity to reduce its liabilities and increase its net profit and hence its net worth. Risk reduction method 10 can permit insurance companies to assume a risk whose future value is known. Risk reduction method 10 can permit corporations to reduce debt, increase net profit, increase their net worth, increase their cash flow and improve their credit rating. Improving their credit rating can permit some companies to borrow working capital at lower rates thereby further increasing their profits, net worth and cash flow.

Financial debt holders benefit from risk reduction method 10 by improving the quality of their credit and by reducing the amount of bad debts the financial institution will incur. The purchaser benefits by increasing its total business with a known risk and a fixed dollar obligation and a known due date. Furthermore, in the case where the purchaser is an insurance company, the insurance premium is a single payment paid in advance. As previously described, the purchaser can be an insurance company, a consortium including an insurance company or any other entity performing the operations described. Liability as used herein can include, without limitation, debts, mortgages, notes, commercial paper, bonds, deferred tax liabilities, or any interest bearing obligation, a portion of which is due more than twelve months later in accordance with GAAP.

Without further elaboration, the foregoing will so fully illustrate our invention that others may, by applying current or future knowledge, readily adapt the same for use under various conditions of service.

We claim:

1. A method for reducing risk, comprising the steps of:
    (a) holding by a first party seller a recognized first party liability owed to a second party liability lender by the first party seller whereby the first party seller has an obligation to discharge the recognized first party liability, the recognized first party liability having a first future value $S_1$;
    (b) determining a first present value $P_1$ of the recognized first party liability in accordance with the first future value $S_1$;
    (c) buying the recognized first party liability by a third party insurance company for a second present value $P_2$ greater than the first present value $P_1$, thereby providing a first net gain wherein the recognized first party liability is derecognized to provide a derecognized first party liability and the first party seller retains the obligation to discharge the derecognized first party liability;
    (d) holding the derecognized first party liability by the third party insurance company for a period of time; and
    (e) discharging the derecognized first party liability at the end of the period of time for the first future value $S_1$ that is less than a second future value $S_2$ in accordance with the second present value $P_2$.

2. The method for reducing risk of claim 1, wherein the second present value $P_2$ is determined according to the first present value $P_1$ by determining a profit margin for the third party insurance company and adding the determined profit margin to the first present value $P_1$ to obtain the second present value $P_2$.

3. The method for reducing risk of claim 1, wherein the third party insurance company holds the first party liability for a period of time t before selling the first party liability.

4. The method for reducing risk of claim 3, wherein the third party insurance company sells the first party liability to a fourth party buyer before t years from the purchase elapse.

5. The method for reducing risk of claim 3, where the fourth party is an insurance company.

6. The method of reducing risk of claim 3, wherein the third party insurance company acquiring the first party liability at the first present value $P_1$ sells the first party liability to a fifth party before t years from the purchase elapse.

7. The method for reducing risk of claim 1, wherein the second present value $P_2$ is determined according to the second future value $S_2$.

8. The method for reducing risk of claim 1, wherein the first future value $S_1$ is known at the time of the determining of the first present value $P_1$.

9. The method for reducing risk of claim 1, wherein the first net gain is a net gain for the seller equal to the first future value $S_1$ less the second present value $P_2$ and the second net gain is a net gain for the buyer entity equal the second future value less $S_2$ the first future value $S_1$.

10. The method for reducing risk of claim 1, wherein the liability is recorded as a long term debt by the seller prior to the buying of step (c) and as a present value by the buyer entity after the buying of step (c).

11. The method for reducing risk of claim 1, wherein the third party insurance company comprises a consortium including an insurance company.

12. The method for reducing risk of claim 1, wherein the first party liability is due on a predetermined due date and the period of time of step (d) extends to a date prior to the predetermined due date.

13. The method for reducing risk of claim 12, wherein the first party liability is due on a predetermined due date and the period of time of step (d) extends to the predetermined due date.

14. The method for reducing risk of claim 12, wherein the first party liability is due on a predetermined due date and the period of time of step (d) extends to a date later than the predetermined due date.

* * * * *